May 30, 1967 W. J. MAYER ET AL 3,322,929
METHOD OF ERODING CAVITIES BY ELECTRIC DISCHARGE MACHINING
Filed June 27, 1963 5 Sheets-Sheet 1

INVENTORS
WILLIAM J. MAYER
CARL E. NORDSTROM
BY
ATTORNEY

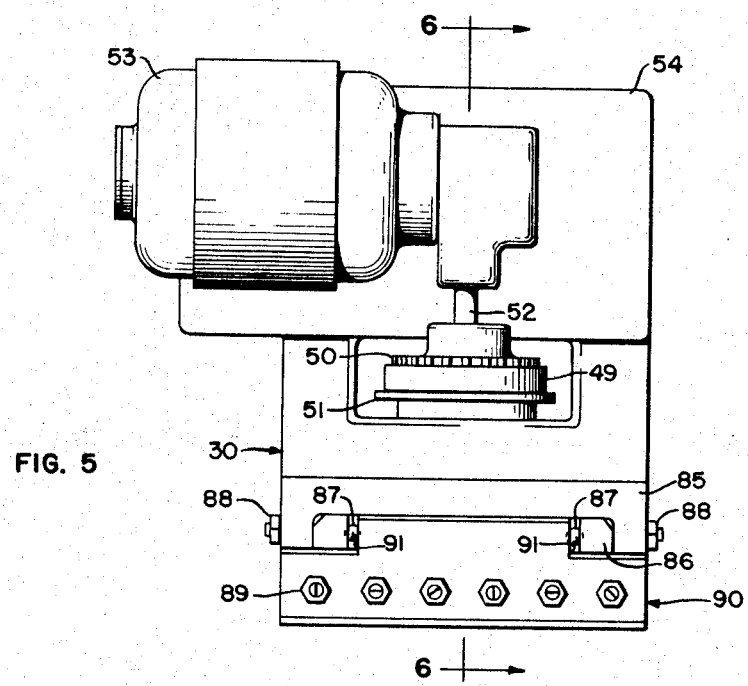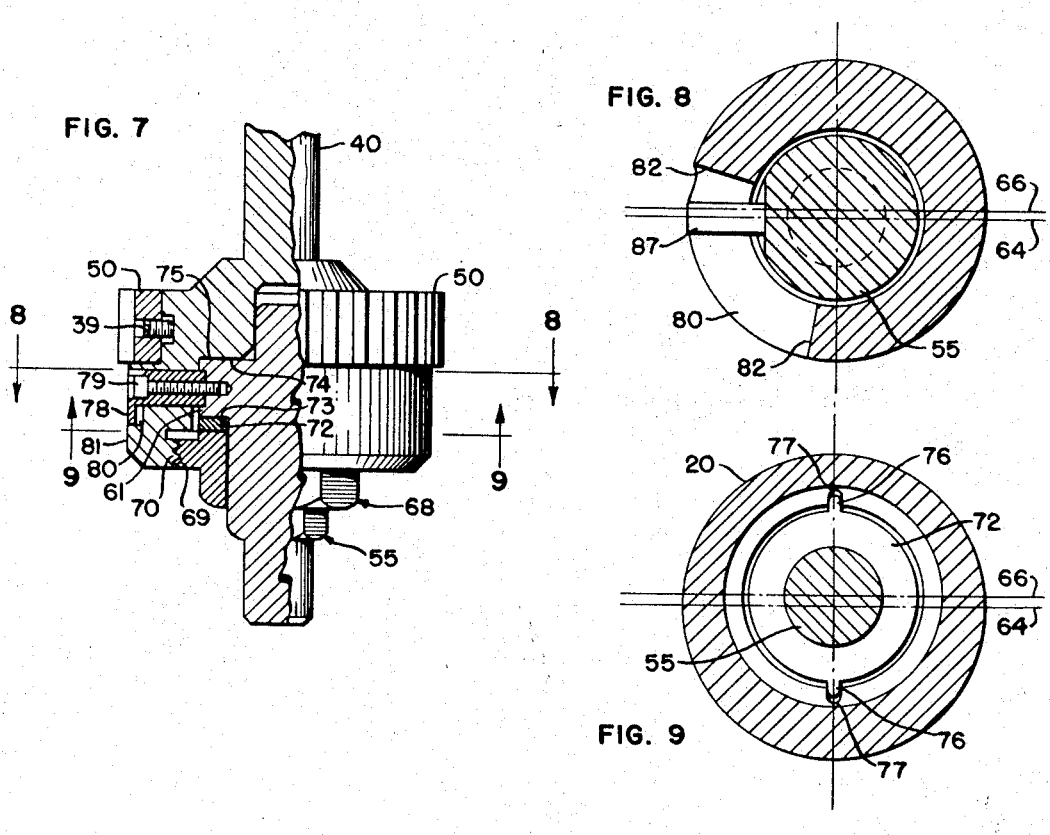

United States Patent Office 3,322,929
Patented May 30, 1967

3,322,929
METHOD OF ERODING CAVITIES BY ELECTRIC DISCHARGE MACHINING
William J. Mayer, Roselle, and Carl E. Nordstrom, Skokie, Ill., assignors to Teletype Corporation, Skokie, Ill., a corporation of Delaware
Filed June 27, 1963, Ser. No. 291,196
1 Claim. (Cl. 219—69)

This invention relates to a method of and apparatus for machining cavities or holes in work pieces and more particularly for machining cavities in work pieces used in a blanking die set.

The present invention is directed to the problem of machining cavities in conductive or metallic work pieces by electrical discharges between the cutting tool and the work and to provide holes or cavities that are of the same configuration as the machining tool or electrode, but which are of a larger size. A typical instance where it is desired to have a cavity of a size larger than the tool or electrode is in the cutting of a die cavity for use with a punch having the same size and shape as the electrode. For typical soft steel metals, the amount of clearance (over-size) between a point on the punch and a corresponding point on the wall of the die would be approximately 5% of the stock thickness and hence for $\frac{1}{16}$" stock there would be approximately .0033" clearance and for $\frac{1}{8}$" stock there would be slightly in excess of .0066" clearance. When harder steels are employed, the clearance between the punch and die may be as much as 10%. A problem has heretofore existed in the electrical discharge machining art in that to obtain clearances of any magnitude between a die and a punch there was an accompanying unsatisfactory finish on the machined surface on the wall of the die cavity.

Some of the prior art methods of obtaining an overcut or clearance between the die and the punch involved the plating of a material over the punch whereby the plated material formed the cutting electrode. This method suffered from the defect that the commercially used plating materials are not as desirable an electrode material as are the more commonly employed brass and graphite electrode materials. Furthermore, a plating material tends to collect or build up on corners or projections and, hence, does not give a uniform coating over the entire punch. Also, a coating of the material generally will not give a uniform coating within narrow cracks or crevasses.

Another prior art method of increasing the amount of overcut between the electrode and a cavity formed in the die stock material was to increase the current and/or capacitance to give a higher energy level discharge. While it has been suggested that increasing of the capacitance and/or current will achieve .005" overcuts, actual practice demonstrates that a practical maximum of .002" is the upper limit of overcut consonant with a suitable (but rough) finish on the wall of the die cavity. This method is unsatisfactory where clearances of .002" or more is required and a finish is required that is as good or better than the finish obtained with the capacitance and/or current that normally is used to produce a .002" clearance or overcut.

Another prior art method of making an overcut in a die cavity was to employ an electrode that is oversized in relationship to the size of the punch that is to be employed. A first objection to making an oversize electrode is that it is very costly to make a punch and to hold it within very accurate tolerances and to also make an oversize electrode having the same configuration that is precisely larger by a uniform amount around its entire periphery. It has been found to be most satisfactory to bond the punch and electrode material together and then to machine them simultaneously in one operation to the same configuration, thereby eliminating any differences in configuration. Conversely, when an electrode is made separately and of a larger size than the punch, the same tool is not used for making the electrode and the punch. This usually results in slight differences between the configurations of the electrode and punch. Also, when the electrode is secured to the punch there will be a build-up of tolerances between the punch and the oversized electrode.

Another prior art method of making oversized cavities in metal is shown in the Martellotti et al. Patent No. 2,773,968, granted Dec. 11, 1956. In this patent a cylindrical hole or cavity is formed in the die blank by rotating the electrode while moving the electrode in a planetary path about a generating axis. This method, however, is limited to the specific case where a circular cross section shape of electrode can be employed or where a cavity has a circular cross section, whereas in normal usage it is desired to have noncircular cross sectioned punches and cavities of various odd shapes.

The present invention is directed towards eliminating these shortcomings of the above-described prior art methods by providing a new and improved method and apparatus for making overcuts in noncircular cross section cavities as well as circular cross section cavities.

An object of the invention is to provide a new and improved method of and an apparatus for making noncircular cavities of a size larger than the size of an electrode employed for making such cavities in an electrical discharge machine while achieving a satisfactory machine finish on the walls of the cavities.

A further object of the invention is to use the same noncircular electrode for making overcuts of various sizes by controlling the amount of movement of the electrode.

Another object of the invention is to make a noncircular cavity in a conductive work piece of a shape similar to but of a larger size than the cutting electrode by mechanically moving the electrode in an orbital path relative to the work piece while preventing rotation of the electrode relative to the work piece.

A further object of the invention is to provide an electrical discharge machine with a mechanical translator for orbiting the electrode relative to the work piece while preventing rotation of the electrode relative to the work piece.

According to the preferred embodiment of the invention there is employed a commercially available electrical discharge machine having a tool head movable toward and from a worktable, upon which is carried a work piece, which piece is to be machined by an electrode supported in the tool head. To the tool head of the electrical discharge machine there is secured a mechanical translating means which translates an orbital and rotary movement of a driving means into only an orbiting movement of the electrode about a fixed axis. That is, the electrode moves in an orbital path without receiving a rotation about its own axis. Thus, the electrode moves through an orbital path about a fixed axis and can be used to make overcuts in a work piece. The amount of overcutting is equal to the radius of the orbital path from the fixed center of rotation. This radius can be varied quite easily by mechanically offsetting, i.e., eccentrically positioning, the axis of the electrode from a generating axis. Since it is the increased mechanical movement rather than the increased energy level of the electrical discharge that enables the making of larger size overcuts, large overcuts can be easily made and the capacitance and current employed can be kept quite small.

More specifically in the preferred embodiment of the invention, the translating attachment for the electrical discharge machine employs a first shaft whose axis of rotation is fixed relative to a frame and a second shaft whose axis of rotation is movable with respect to the frame and the axis of rotation of the first shaft. The first and second shafts can be aligned or they can be moved eccentrically relative one to another by predetermined increments. The second shaft has one end thereof journalled in a first slide carried by the frame and the movement of the first slide is limited to rectilinear movement in one planar path. The first slide carries a second slide which is capable only of rectilinear movement in a path at right angles to the movement of the first slide. The electrode is attached to the second slide and receives a movement that is the resultant movement of the instantaneous components of movements of the first and second slides. The second shaft is rotated with the first shaft and its lower eccentric end is moved in an orbital path about the axis of the first shaft. As the lower end of the second shaft orbits, it will drive the second slide and the second slide drives the first slide simultaneously therewith thereby to hold the second slide from rotating while it is orbiting. Since the electrode is attached to the second slide and the second slide's movement is restricted by the first slide, the electrode does not rotate but moves in a path that is the resultant of the rectilinear components of movements of the first and second slide about the fixed axis. The amount of overcut is equal to the radius of eccentricity of the first shaft relative to the second shaft plus the electrical overcut, and by varying this amount of eccentricity and electrical overcut the size of the overcut can be varied from a minimum electrical overcut wherein the first and second shaft have their axes aligned, to distances as much as fifteen thousandths of an inch with the apparatus hereinafter described.

A more complete understanding of the present invention may be obtained from the following detailed description of the method and apparatus when read in conjunction with the appended drawings wherein:

FIG. 5 is an enlarged side elevational view of the electrode orbiting attachment;

FIG. 7 is an enlarged partial sectional view showing an indicator and the eccentric mounting of a second shaft relative to a driving shaft;

FIG. 8 is a sectional view taken along the line 8—8 in FIG. 7 in the direction of the arrows and showing the position of the axis of the second shaft relative to the axis of the driving shaft;

FIG. 9 is a sectional view taken along the line 9—9 in FIG. 7 in the direction of the arrows and showing the eccentric mounting of the second shaft within the driving shaft;

Figure 2:
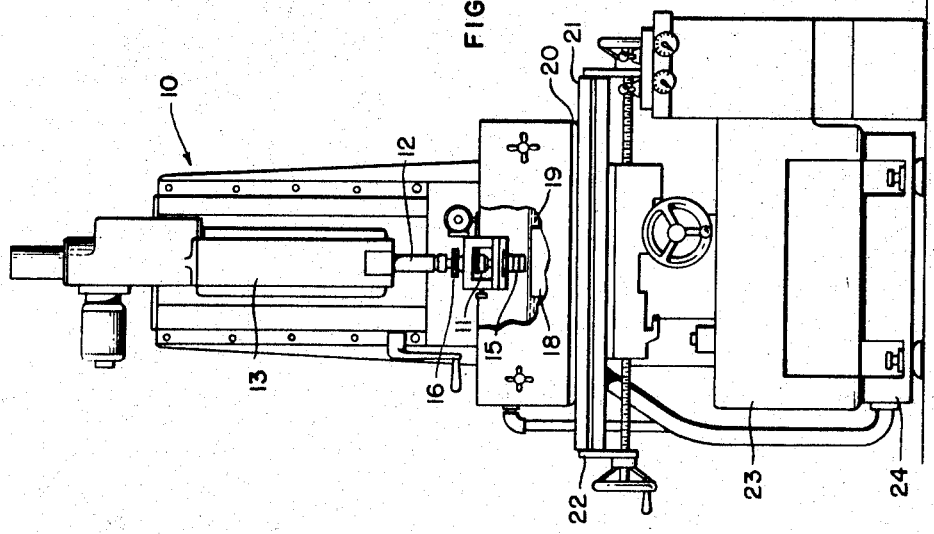
FIG. 2 is a front elevational view of the conventional electrical discharge machine having the electrode orbiting attachment secured thereto.
Figure 1:
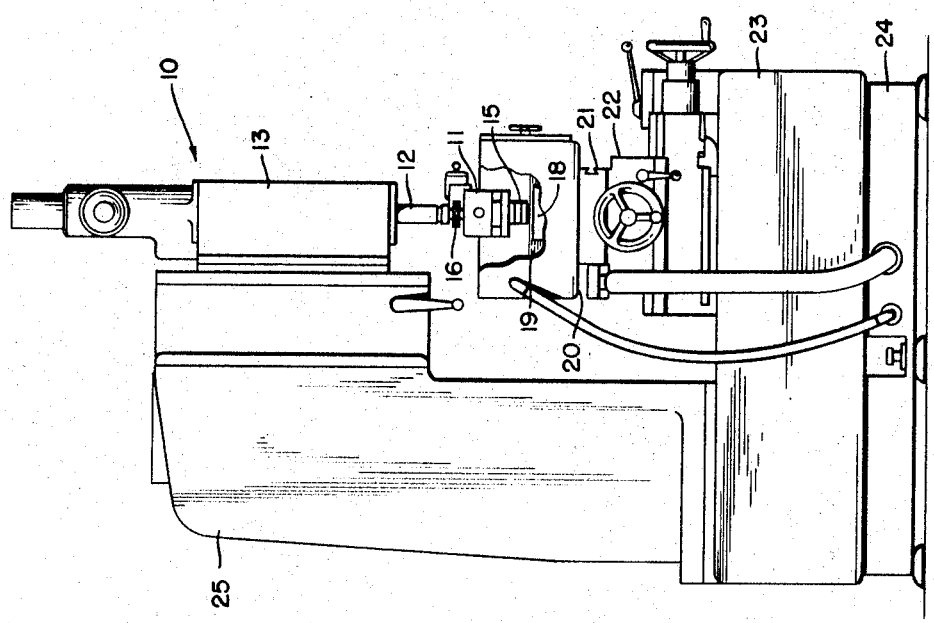
FIG. 1 is a side elevational view of a conventional electrical discharge machine having an electrode orbiting attachment secured thereto according to the preferred embodiment of the invention.

Referring now to the drawings and more particularly FIGS. 1 and 2, there is shown a conventional electrical discharge machine 10 whose general operation is not part of the present invention and whose operation is described in general terms only so as to afford a proper background for the description of the operation of an electrode orbiting attachment 11. The electrode orbiting attachment 11 is secured to a quill 12 in an upstanding tool head 13 of this electrical discharge machine 10. In an electrical discharge machine, an electrode is normally secured to the quill 12 directly by a conventional chuck; however, in the present instance, an electrode 15 is suitably secured to the electrode orbiting attachment 11, which in turn, is secured by a chuck 16 to the quill 12 of the electrical discharge machine.

In the electrical discharge machine, a work piece 18 is positioned in a dielectric bath of light oil 19 carried within a work tank 20. The dielectric oil bath 19 covers both the work piece 18 and the bottom portion of the electrode 15 so that, as the electrical discharges occur between the electrode 15 and the work piece 18, the oil bath 19 serves as a dielectric and also serves to act as a means to flush away the debris of metal removed during an electrical discharge operation.

The electrode 15 is spaced very slightly from the work piece 18 and as successive electrical discharges occur, the metal in the work piece 18 will be machined or eroded therefrom in the configuration of the electrode. The quill 12 is lowered vertically downward at a rate coordinated with the rate of removal of material from the work piece 18 so that the electrode 15 is always spaced from the work piece 18 by a constant distance. As a general rule, with lower capacitances and amperages, smaller erosions take place thereby resulting in a better machined finished surface whereas; with higher capacitances and amperages the energy level of the discharge is increased and the amount of material removed in the single discharge causes a deeper erosion or pit in the wall of the machine work piece thereby producing a rougher finished surface. Also, with increasing current and capacitance to provide higher energy level electrical discharge, the amount of time between discharges, i.e., the frequency, must be lowered.

It is common practice in the electrical discharge machining art to erode out the cavity roughly to shape in a first operation, and then to perform a second machining operation to cut the cavity more precisely to shape. In the first operation a high energy level electrical discharge is used to erode large amounts of material from the work piece and in the second machining operation the frequency of the electrical discharge is increased and the energy level of the discharge is decreased. During a first or rough cutting operation, the electrode 15 is moved only in the vertical direction as though it were attached directly to quill 12 and the electrical orbiting attachment 11 does not function to orbit the electrode 15 relative to the work piece 18.

Before proceeding to a detailed description of the electrode orbiting attachment 11, it is to be noted that the work piece 18 is mounted on a worktable 21 movable in a lateral direction as seen in FIG. 2, which worktable, is in turn carried by a saddle 22 mounted for movement at right angles thereto across a bed 23 secured to a base 24 of the electrical discharge machine 10. Thus, it should be apparent that the work piece 18 can be adjusted in either the lateral or longitudinal direction beneath electrode 15 and that electrode 15 can be moved in the vertical direction by the quill 12 of the tool head 13 carried by column 25 of the electrical discharge machine 10.

Heretofore, when making overcuts of noncircular configuration, an oversized electrode was employed or the energy level of the spark discharge was increased to erode more metal. The term "overcut" is generally defined as being the distance (FIG. 11) between a point on the electrode such as the point 26 on the electrode 15 and the corresponding point 27 on the work piece 18. When employing higher energy level discharges to obtain overcuts of .002" or more, larger craters or pits are formed in the wall and such a poor finish is obtained on the wall that this method of making an overcut for a blanking die is not practical. The size of overcuts would be from approximately .003" to in excess of .006" for mild steel of 1/16" and 1/8" thickness.

When using the electrode orbiting attachment 11, the electrode 15 is given an orbital movement about the fixed axis of the rough cut or already formed cavity in the work piece 18. By mechanically moving the electrode 15 relative to the work piece without rotating the electrode 15, the electrode 15 will machine and remove metal from the work piece 18 in a larger configuration but in the same precise configuration as the electrode 15 and low energy level discharges may be employed to machine larger sized overcuts and also to machine better finishes than could heretofore be obtained by higher energy discharges from a nonorbiting electrode.

While a chuck is normally provided on the quill 12 for grasping the electrode, this chuck has been removed and a chuck 16 (FIG. 6) has been made integral with the electrode orbiting attachment 11 for securing the electrode orbiting attachment 11 to the quill 12. The quill 12 has a hallow sleeve (not shown) into which may be inserted the upper portion of a shaft 40 of the electrode orbiting attachment 11 and the quill 12 has a tapered portion (not shown) for matching engagement with the tapered portion 29 of a frame 30 of the electrode orbiting attachment 11. The chuck 16 includes a collar ring 31 split into two identical halves, each half having an inclined surface 32 for engaging a corresponding inclined surface 33 on the lower tapered portion 34 of the frame 30. The collar 31 is secured to an integrally threaded hexagonal member 35 by a plurality of fastener pins 36. The lower exterior surface of the quill 12 is threaded for engagement with the internal thread on the hexagonal member 35 so that rotation of the hexagonal member 35 relative to the fixed quill 12 will cause the frame 30 and its tapered portion 29 to move vertically relative toward a matching inclined surface (not shown) within the quill 12.

The frame 30 of the electrode orbiting attachment 11 has a central upwardly extending cylindrical bore 37 therein which terminates in an enlarged opening 38. Extending upwardly through the bore 37 and opening 38 is a driving shaft 40 whose upper end is threaded into a bearing lock nut 41. By tightening lock nut 41 a shoulder 42 of the driving shaft 40 may be pulled against a washer 43 situated in the opening 38 beneath a bearing 44 for the shaft 40. The lower portion 45 of the drive shaft 40 is journalled in a bearing 46 that is secured within an opening 47 of the frame 30 by a bearing retainer plate 48 which is suitably secured to the frame 30. Thus, the drive shaft 40 is journalled in bearings 44 and 46 for rotation by a toothed driving belt 49 which is in driving engagement with a toothed member 50 secured to the drive shaft 40 by set screws 39 (FIG. 7).

Figure 3:
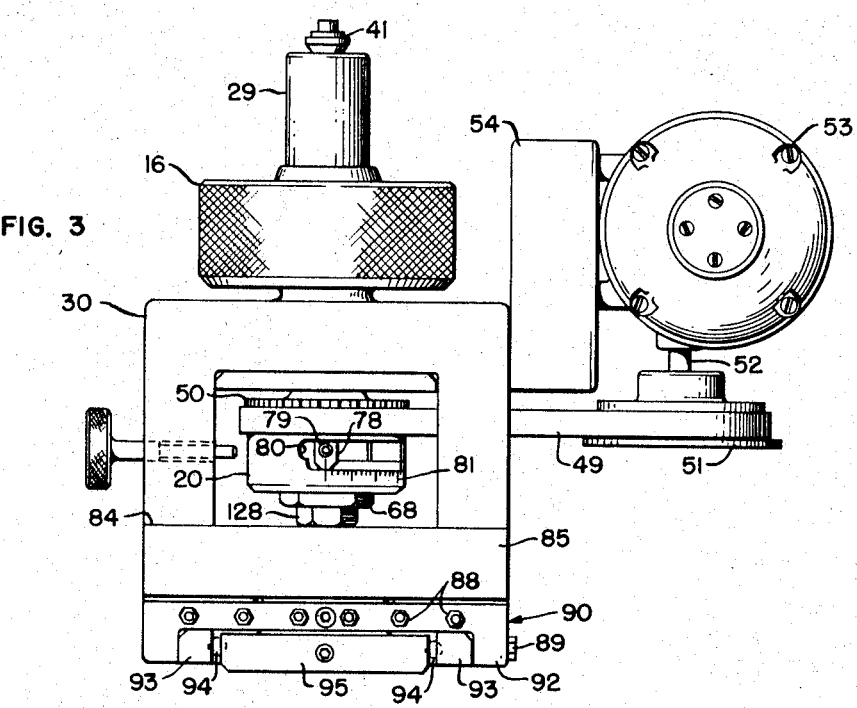
FIG. 3 is an enlarged front view of the electrode orbiting attachment according to the preferred embodiment of the invention.
Figure 4:
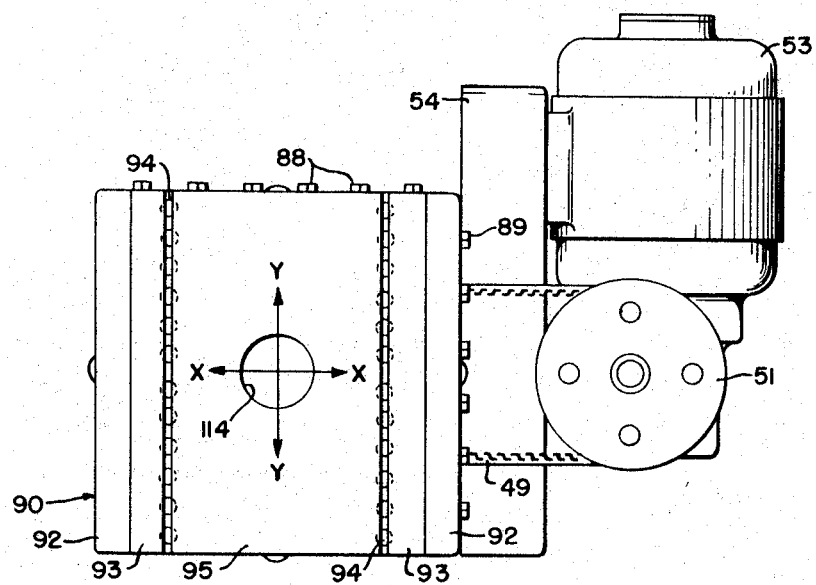
FIG. 4 is an enlarged bottom view of the electrode orbiting attachment.

The driving belt 49, as seen in FIGS. 3 and 4, is trained about a driving pulley 51 secured to a shaft 52 of a driving gear motor 53. The driving gear motor 53 is mounted on a mounting block 54 secured to the frame 30.

Figure 6:
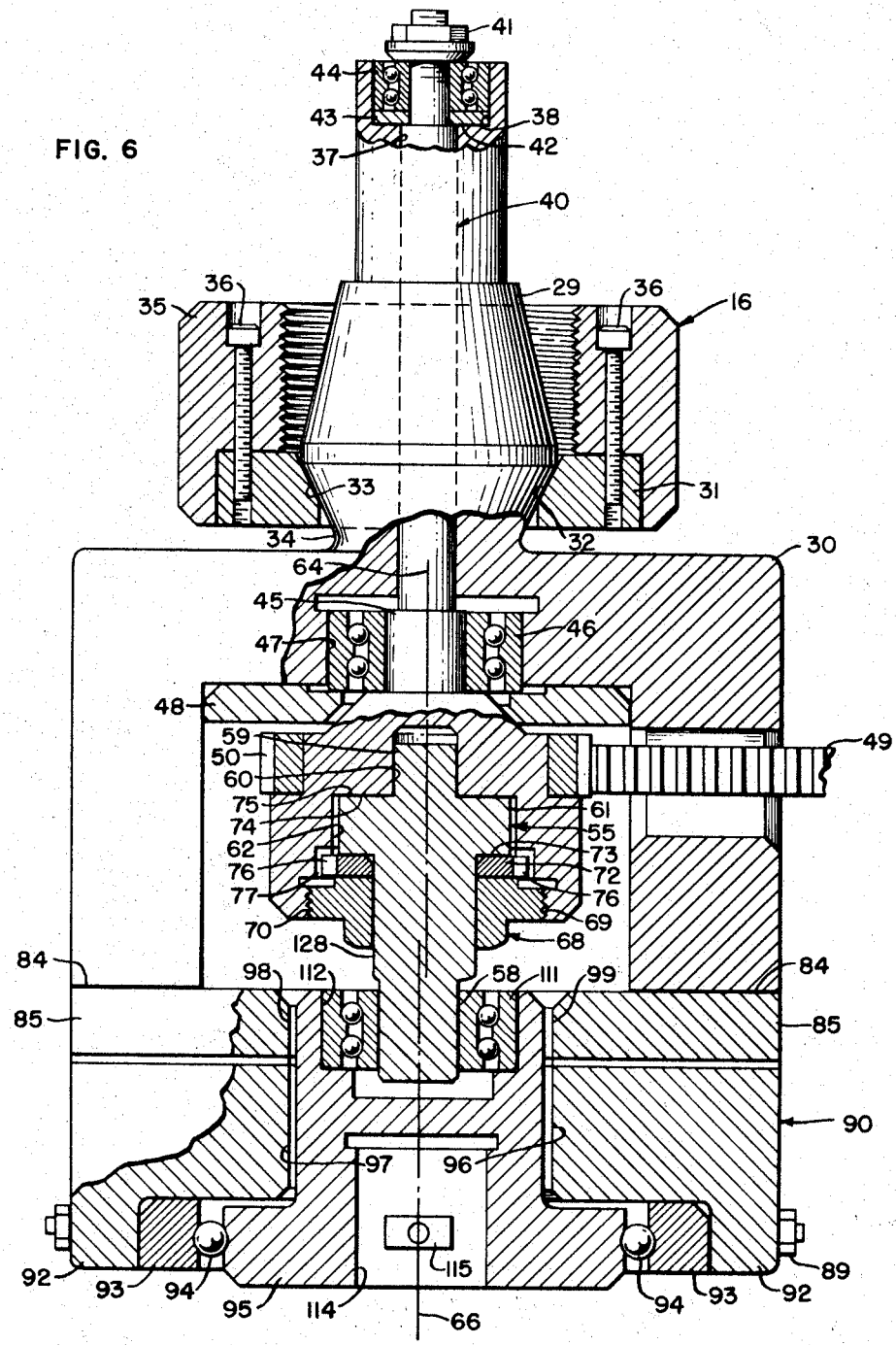
FIG. 6 is a sectional view taken along the line 6—6 in FIG. 5 in the direction of the arrows showing the electrode orbiting attachment.

As seen in FIGS. 6 and 7, a second shaft 55 has an upper cylindrical portion 59 inserted in a small bore 60 in the driving shaft 40 and has an integral collar 61 situated in an oversized bore 62 in the shaft 40. The bore 60 has its center line 65 offset from the center line 64 of the driving shaft 40 by a distance equal to or greater than the maximum amount of overcut. In the embodiment disclosed herein the maximum overcut to be effected is .015" and consequently the amount of offset between center lines 64 and 65 is slightly in excess of .015". The center line 66 of the driving free end 58 of the second shaft 55 is offset a distance of at least .015" from the center line 65 of the bore 60.

From the foregoing, it should be apparent that by rotating the cylindrical portion 59 within the small bore 60, the center line 66 of the driving free end 58 can be moved to be aligned exactly with the center line 64 of the driving shaft 40 and hence the driving free end 58 may be rotated without orbiting about the center line 64 of the driving shaft 40. As will be brought out hereinafter, the electrode 15 will not orbit when the center lines 64 and 66 are aligned. However, the cylindrical portion 59 may be rotated within the small bore 60 to move the center line 66 out of alignment with center line 64 of the driving shaft 40 as the center line 66 is rotated about the center line 65 of the bore 60. When the center lines 64 and 66 are offset with respect to each other, the driving free end 58 of the shaft will orbit about the center line 65 while it rotates about its own axis or center line 66, the shaft 55 being clamped to the shaft 40 must rotate with it. The electrode 15 will also orbit about the center line 64 but it will not rotate, as will be brought out hereinafter. The amount of offset between the center lines 64 and 66 should be adjusted to approximately the amount of overcut desired making allowance for the electrical action.

The second shaft 55 may be fixedly secured in different positions relative to the driving shaft 40 by tightening a clamping nut 68 (FIG. 7) which has a threaded portion 69 in threaded engagement with a threaded portion 70 on the interior surface of the lower end of the driving shaft 40. As seen in FIG. 7 the lower portion of the clamping nut 68 comprises a hexagonal head and the nut can be turned by a suitable wrench to cause the clamping nut 68 to move upwardly and press the turn isolating washer 72 against the bottom surface 73 on the collar 61 and thereby in turn clamp the upper surface 74 of the collar against the shoulder 75 on the driving shaft 40. As seen in FIG. 9, the turn isolating washer 72 has a pair of opposed projections 76 inserted in matching vertical openings 77 in the bore of drive shaft 40 so that the washer 72 may partake of only vertical movement with respect to the drive shaft 40 and the shaft 55.

As best seen in FIG. 3, an indicator is provided to show the amount of offset of the center line 66 of the driving end 58 from the center line 64 of the drive shaft 40. The indicator has a pointer 78 secured by fastener 79 (FIG. 7) to the second shaft 55. The indicator also has a scale 81 for cooperating with the pointer 78 and the scale is formed on the outer surface of the bottom portion of the driving shaft 40. As best seen in FIGS. 3, 7 and 8 the outer surface of the drive shaft 40 has a slot 80 milled therein in which the pointer 78 is free to be rotated in an accurate manner within the limits of the walls 82 of the slot, as shown in FIG. 8. Thus, it should be apparent that as the shaft 55 is rotated by turning its hexagonal headed lower portion 128, its attached pointer 78 is moved with it and indicates the amount by which the center line 66 of the driving end is offset with respect to the center line 64 of the driving shaft 40.

The frame 30 of the electrode orbiting attachment 11 is of inverted U-shaped configuration (FIG. 3) and has legs terminating in walls 84 to which a pair of spaced ball bearing slide saddles 85 are secured. As best seen in FIG. 5, each of the ball bearing slide saddles 85 has a ball bearing retainer 86 secured thereto by fasteners 88. The ball bearing retainers 86 serve to hold two sets of ball bearings 87 in rectilinear ball races formed in opposite upwardly extending side walls 91 of an X axis slide 90 thereby to support the slide 90 for tranverse rectilinear movement as viewed in FIG. 3.

The X axis slide 90 has two oppositely disposed depending portions 92 (FIG. 3) to which are attached ball bearing retainers 93 that are held in place by fasteners 89.

The bearing retainers 93 hold two sets of ball bearings 94 in ball races formed in the side for movement at right angles to the path of movement of the X axis slide 90.

As seen in FIG. 6, the free end 58 of the shaft 55 is journalled in a double row ball bearing 111 which is held within a circular opening 112 in the upper surface of the Y axis slide 95.

When the center line 66 of the free end 58 of the shaft 55 is aligned with the axis of rotation or center line 64 of the driving shaft 40, the free end 58 will rotate within the ball bearing 111 without moving the slides 90 and 95. However, when the center line 66 of the driving end 58 of the shaft 55 is offset with respect to the center line 64 of the drive shaft 40, the orbital movement of the center line 66 of the driving end 58 about the center line 64 of the driving shaft 40 causes the driving end 58 of shaft 55, while rotating in the bearing 111, to the Y axis slide 95 in an orbital path. The Y axis slide 95, however, will not rotate but will slide back and forth (in the Y direction: FIG. 5) with respect to the X axis slide 90 which in turn will slide transversely of the apparatus (in the X direction) on its bearings 94.

Figure 10:
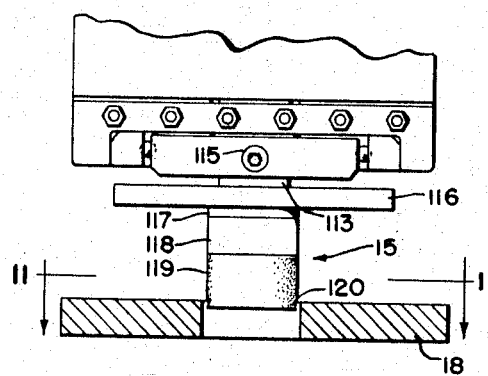
FIG. 10 is an enlarged view showing an electrode secured to the orbital attachment and showing the electrode moving through a work piece.

It should be noted that while the Y axis slide 95 thus moves in a circular or orbital path about the center line 64 of the driving shaft 40, that the Y axis slide 95 does not rotate about its own center line as do the shafts 40 and 55. Accordingly, when the electrode 15 has its upper portion 113 (FIG. 10) inserted in a cylindrical recess 114 in the Y axis slide 95 and is secured therein by a set screw 115, the electrode 15 will receive the same orbital movement as the Y axis slide 95. That is, the electrode 15 will not rotate but will orbit about the center line 64 of the drive shaft 40.

Figure 14:
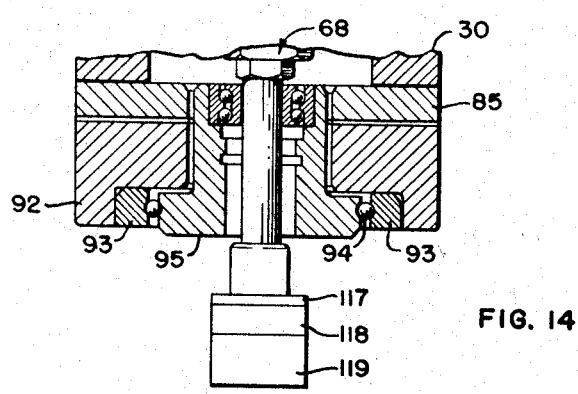
FIG. 14 illustrates a modification of the present invention wherein the electrode is directly attached to a rotating and orbiting shaft for orbiting and rotating the electrode.

In the embodiment shown in FIG. 14, the free end 58 of shaft 55 is extended into the cylindrical recess 114 and an electrode 15 is shown attached directly thereto rather than being attached to the Y axis slide 95 as hereinbefore described. When the electrode 15 is attached to the free end 58 of the shaft 55, the electrode 15 will rotate and orbit about the center line 64. Manifestly, only circular configurations can be eroded when the electrode 15 is rotated with the shaft 55, but a larger overcut can also be achieved due to the orbital movement of the electrode 15. Thus, with the present orbiting attachment the type of operation accomplished with the complicated mechanisms of the prior art, may be effected with the simple attachment shown herein.

The electrode 15 preferably consists of an electrode plate 116 (FIG. 10) to which has been bonded a shedder plate 117. Bonded to the shedder plate 117 is a punch element 118 and to punch element 118, in turn, is bonded an electrode member or tool 119. In the preferred embodiment of the invention the shedder plate 117, punch element 118 and tool 119 are bonded together and are machined to shape in the same operation so that each of the three above-identified elements of the electrode 15 are of identical dimensions.

As hereinbefore explained, the movement of the tool 119 downwardly into close proximity to the work piece 18 causes the generation of periodic electrical discharges which will machine metal from the work piece 18. A machining operation of a work piece 18 is accompanied by the tool 119 wearing away as at 120.

Figure 11:
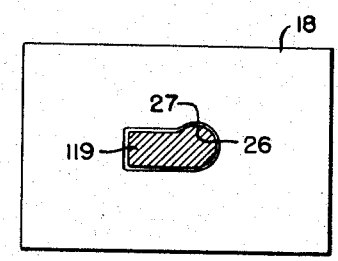
FIG. 11 is a sectional view taken along the line 11—11 in FIG. 10 in the direction of the arrows showing the cross section of the electrode, the configuration of the cavity in the work piece, and the amount of overcut.

FIG. 11 shows the configuration of a work piece such as work piece 18, which may be in fact, a die plate that would have approximately .006" clearance between the point 26 on the punch and the corresponding point 27 on the die. An overcut of this dimension is of course easily obtainable by orbiting the tool 119 during the machining of the workpiece 18.

The electrode 119 is preferably of a carbon material, although it could also be of brass or any other well known electrode material. When it is desired to machine a cavity closely dimensioned to the size of the punch or when little or no clearance is desired, the shaft 55 is locked in position wherein center line 66 coincides with center line 64 so that the free end 58 of the shaft 55 partakes in no orbital movement about the center line 64. Thus, any overcut obtained will be due to the electrical discharge rather than a mechanical movement of the tool 119.

Figure 12:
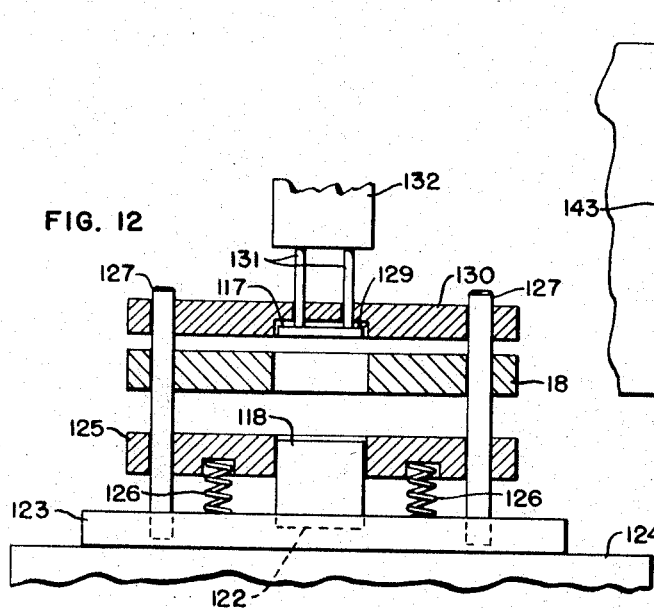
FIG. 12 is a sectional view diagrammatically showing the relationship between the punch, stripper plate, die plate and shedder plate.

As will be brought out hereinafter in conjunction with the description of FIG. 12, the same electrode 15 is used for machining cavities in a punch plate 123, stripper plate 125, die plate 18 and shedder plate 130.

For example, when machining a cavity 122 in a punch plate 123, the center lines 64 and 66 are aligned since only a small amount of overcut is desired as the punch 118 will be inserted therein and braced thereto to form a punch element for securing to a frame 124 of a punch press. Also, when cutting a hole through a stripper plate 125, the amount of overcut desired is very small and the overcut or clearance can be obtained by conventional methods such as increasing the energy level of the electrical discharges. The stripper plate 125 is shown mounted on a pair of springs 126 and guided by a pair of rods 127.

However, as hereinbefore described for a blanking die or other applications, it is often desired to have a clearance of overcut exceeding that available by using a higher energy level spark and that which would be consonant with a good machine finish on the wall of the die. Thus, for example, if it were desired to obtain .006" overcut, the operator would loosen the clamping nut 68 and insert a wrench into the U-shaped frame portion 30 and turn hexagonal portion 128 on the second shaft 55. As the shaft 55 rotates, it carries the pointer 78 with it and the pointer 78 moves across the scale 81 and the operator can stop the rotation of the shaft 55 relative to the driving shaft 40 when the indicator is at the .006" mark. The operator will then tighten the clamping nut 68 to force the collar 61 of the shaft 55 upwardly into engagement with the matching shoulder 75 on the driving shaft 40. The center line 66 of the driving end 58 is now positioned a distance of .006" from the center line 64 of the driving shaft 40. Thus, as the shaft 40 rotates, the center line 66 of the shaft 55 will be moved in a circular path having a radius of .006". The circular or orbital path of the center line 66 of the driving end 58 inserted in the ball bearing 111 causes the X axis slide 92 and Y axis slide 95 to reciprocate on their respective bearings to hold the slide against rotation. Since the electrode 15 is secured within the cylindrical recess 114 of the Y axis slide 95, it partakes of the same movements, the path of which is an orbit.

The largest size cavity 129 is normally formed in a shedder plate 130 for receiving the shedder 117. A pair of pins 131 are connected to the shedder 117 and are actuated by a ram 132 to move the shedder 117 down into the cavity of the die plate 18 to knock out any piece parts that may have remained therein after being forced into this cavity by the punch 118.

From the foregoing it should be apparent that during the machining of a cavity the electrode 15 will orbit many times about the generating axis or center line 64. As the electrode 15 continuously orbits, it is slowly moved downwardly through the roughed-out cavity and continuously machines the cavity to a larger size than the size of the electrode but having the same precise configuration as the electrode. It should be realized that the orbital movement of the electrode 15 about a stationary work piece 18 is merely a relative movement and that conversely the work piece 18 could be orbited about a stationary electrode.

Figure 13:
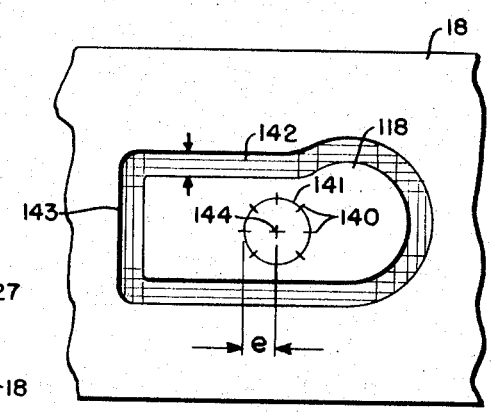
FIG. 13 is a diagrammatic illustration of the movements of the electrode relative to the work piece and the amount of overcut made at various positions.

A method of orbiting the work piece 18 relative to the electrode 15 while electrical discharge machining operations are in progress, in accordance with the presesnt invention, may be employed without any orbital attachment to a conventional electrical discharge machine. In the practice of such a method, it is first determined how great an overcut is desired. This amount of overcut corresponds to the distance e or the radius of an orbital path 141 as seen in FIG. 13. The orbital path 141 is greatly enlarged in this figure for purposes of illustration. Then the lateral and longitudinal distance of each of the eight positions 140 on an orbital path 141 is calculated. After the electrode 15 finishes a roughing-out operation during which the center 144 (FIG. 13) of the work piece 18 is aligned with the center line of the quill 12, the worktable 21 is moved laterally and/or longitudinally to bring the center line of the quill 12 over one of the circumferential points 140 on the orbital path 141. The electrode 15 is subsequently lowered at each position and the electrode 15 machines away only that portion of the wall of the cavity with which it is close enough to machine away. The dotted lines 142 are representative of various positions that the electrode 15 will assume when machining such an overlapped portion. For each of the remaining points 142 the worktable 21 and work piece 18 are moved laterally and/or longitudinally to bring the center line of the quill over the next point 140 on the orbital path.

As should be apparent from the dotted line configuration 142, the work piece did not move over the entire area outlined in a solid line 143 which is the configuration obtainable when using the orbital attachment 11. That is to say, the eight positions 140 roughly define an orbital path. Manifestly, the moving of the worktable through a greater number of positions on the orbital path 141 would more closely approximate an orbital path and result in more metal being machined from the cavity and the enlarged cavity would more precisely approach the configuraiton 143 of the electrode 15. It should be noted that it would require moving the table through almost an infinite number of positions to obtain a true orbital path, whereas with the orbital attachment 11, a true orbital movement is obtained. Also, a large number of orbits is obtained during the lowering of the electrode whereas with the above method only one approximate orbital movement is made.

From the foregoing, it will be seen that there has been set forth a method of obtaining overcuts by orbiting a noncircular electrode relative to a work piece with or without a mechanical orbital attachment for a conventional electrical discharge machine. Also, there has been set forth a mechcanical apparatus for moving an electrode in a continuously orbital path while preventing rotation of the electrode. In this manner it is possible to achieve large and precise overcuts while using low energy level electrical discharges and operating at a high frequency rate of discharges thereby obtaining a better machine finish surface in a cavity than has heretofore been obtainable when using other methods.

Although only one embodiment of the invention is shown in the drawings and described in the foregoing specification, it will be understood that invention is not limited to the specific embodiment described, but is capable of modification and rearrangement and substitution of parts and elements without departing from the spirit of the invention.

What is claimed is:

A method of forming mating male and female die set members in which the female member is operatively larger than the male member including the steps of:
  attaching a body of electric discharge machining electrode material to a body of male die set material to form a composite structure;
  machining the composite structure to a predetermined cross-sectional configuration thereby simultaneously forming a male die set member and an electric discharge machining electrode having identical cross-sectional configurations;
  mounting the composite structure in an electric discharge machining tool;
  electric discharge machining a hole in a female die set member by means of the electrode portion of the composite member;
  enlarging the hole in the female die set member by moving the composite structure orbitally with respect to the female die set member without rotation while continuing the electric discharge machining of the hole; and
  seperating the electrode portion of the composite structure from the male die set member thereby providing a male die set member and a female die set member having a hole formed in it which is identical in shape to the male die set member but which is larger in size.

References Cited

UNITED STATES PATENTS

| | | | |
|---|---|---|---|
| 2,924,701 | 2/1960 | Stamper | 219—69 |
| 3,120,601 | 2/1964 | Berlin et al. | 219—69 |
| 3,135,852 | 6/1964 | Bentley et al. | 219—69 |

RICHARD M. WOOD, *Primary Examiner.*

R. F. STAUBLY, *Assistant Examiner.*